United States Patent
Draese et al.

(10) Patent No.: US 9,286,300 B2
(45) Date of Patent: *Mar. 15, 2016

(54) ARCHIVING DATA IN DATABASE MANAGEMENT SYSTEMS

(71) Applicant: International Business Machines Corporation, Armonk, NY (US)

(72) Inventors: Oliver Draese, Holzgerlingen (DE); Namik Hrle, Boeblingen (DE); Claus Kempfert, Altdorf (DE); Oliver Koeth, Stuttgart (DE); Ruiping Li, Cupertino, CA (US); Robert S. Muse, Decatur, GA (US); Knut Stolze, Jenna (DE); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/875,469

(22) Filed: May 2, 2013

(65) Prior Publication Data
US 2014/0095443 A1  Apr. 3, 2014

Related U.S. Application Data

(63) Continuation of application No. 13/630,288, filed on Sep. 28, 2012, now Pat. No. 8,825,604.

(51) Int. Cl.
*G06F 17/30* (2006.01)
*G06F 11/14* (2006.01)
(52) U.S. Cl.
CPC .... G06F 17/30073 (2013.01); G06F 17/30289 (2013.01); G06F 17/30477 (2013.01); G06F 17/30575 (2013.01); *G06F 11/1458* (2013.01)

(58) Field of Classification Search
CPC .................................................. G06F 17/30073
See application file for complete search history.

(56) References Cited

U.S. PATENT DOCUMENTS

| | | | |
|---|---|---|---|
| 7,287,048 B2 | 10/2007 | Bourbonnais et al. | |
| 7,403,959 B2 | 7/2008 | Nishizawa et al. | |
| 7,809,689 B2 | 10/2010 | Bangel et al. | |
| 2003/0158842 A1 | 8/2003 | Levy et al. | |

(Continued)

FOREIGN PATENT DOCUMENTS

EP   2164002 A1 * 3/2010

OTHER PUBLICATIONS

"System and Method for Usage Aware Row Storage in Database Systems", ip.com, Jul. 23, 2010, 4 pages.
"ANSI-SPARC Architecture", http://en.wikipedia.org/wiki/ANSI-SPARC_Architecture, retrieved from the internet on Aug. 17, 2012, pp. 1-3.
Zuzarte et al., "Partitioning in DB2 Using the UNION ALL View", 2002, pp. 1-25.

(Continued)

*Primary Examiner* — Apu Mofiz
*Assistant Examiner* — Dara J Glasser
(74) *Attorney, Agent, or Firm* — Mohammed Kashef; SVL IPLaw Edell, Shapiro & Finnan, LLC (57) ABSTRACT

At least a portion of data from a first processing system is archived onto a second processing system based on partitions of the data. A query received at the first processing system is processed at the second processing system to retrieve archived data satisfying the received query in response to determining at the first processing system that the received query encompasses archived data. Embodiments of the present invention further include methods, systems, and computer program products for archiving and accessing data in substantially the same manner described above.

7 Claims, 7 Drawing Sheets

(56) References Cited

U.S. PATENT DOCUMENTS

| | | |
|---|---|---|
| 2011/0196893 A1 | 8/2011 | Bates et al. |
| 2012/0042130 A1 | 2/2012 | Peapell |
| 2012/0084316 A1 | 4/2012 | Koenig et al. |
| 2012/0084329 A1 | 4/2012 | Arora et al. |
| 2012/0095958 A1* | 4/2012 | Pereira ............... G06F 17/3002 707/609 |
| 2014/0095441 A1 | 4/2014 | Draese |

OTHER PUBLICATIONS

Ritchie, "Nearline and Archiving in the Data Warehouse: What's the Difference?", 5 pages, 2008.

Concise explanation of relevance (3 pages) of foreign document: R. Schaarschmidt, Archiving in Datenbanksystemen—Konzept and Sprache, Teubner Verlag, 2001.

International Search Report and Written Opinion, PCT/CA2013/050735, Feb. 13, 2014, 7 pages.

* cited by examiner

ARCHIVING DATA IN DATABASE MANAGEMENT SYSTEMS

CROSS REFERENCE TO RELATED APPLICATIONS

The present invention claims priority to U.S. Nonprovisional application Ser. No. 13/630,288, filed 28 Sep. 2012 and entitled "Archiving Data in Database Management Systems," the disclosure of which are incorporated herein by reference in its entirety.

BACKGROUND

1. Technical Field

Present invention embodiments relate to archiving data, and more specifically, to archiving data in a database management system employing an accelerator system. Present invention embodiments involve transparent and online access to the archived data through the database management system.

2. Discussion of the Related Art

Managing data volume in an enterprise data warehouse (DWH) has become a major factor for data warehouse design. Managing and querying numerous rows of table data adversely impacts the data warehouse in several manners. For example, disk space is required to store the voluminous amounts of data which may be expensive, especially for high-quality storage (e.g., IBM z/OS storage servers). The size of indexes within a database management system (DBMS) for the data warehouse is increased due to the high number of table rows to be indexed. This further leads to slower index access due to the index size. Since indexes are typically implemented as B-Tree data structures, the index size directly influences the height of the B-Tree. Further, a buffer pool is less efficient since more data has to be handled. This requires more memory to maintain the I/O reduction attained by use of the buffer pool. In addition, maintenance operations (e.g., back-up and recovery) are slower due to increased amounts of data.

Although reducing the sheer data volume in a data warehouse tends to alleviate the above adverse impacts, this approach may impede access to removed data and/or require modification of existing mechanisms or applications to access the removed data.

BRIEF SUMMARY

According to one embodiment of the present invention, at least a portion of data from a first processing system is archived onto a second processing system. A query received at the first processing system is processed at the second processing system to retrieve archived data satisfying the received query in response to determining at the first processing system that the received query encompasses archived data. Embodiments of the present invention further include methods, systems, and computer program products for archiving and accessing data in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

A few common properties may be identified based on an analysis of data in data warehouses (DWH). Initially, most of the data in a data warehouse is static. Although data modifications occur frequently to recent data (e.g., recent orders, etc.), changes to older data occur rarely or not at all (e.g., the old data is read-only most, if not all, of the time). Further, the data is typically organized/partitioned for management purposes and a partitioning key is typically time-based. The partitioning may be done via dedicated tables (e.g., some tables storing old data (e.g., from prior years), while other tables store more recent data (e.g., from the current and/or more recent years)). Thus, a partitioning scheme exists in which partitions for old data may have read-only data access characteristics, while partitions for recent data have mostly read/write access.

Present invention embodiments reduce the sheer data volume in a database management system by archiving older data while retaining access to that archived data. Further, access to recent and/or archived data may be accomplished by the mechanisms of the database management system (DBMS) (e.g., via Structured Query Language (SQL)), and without changing the applications that process the data. Access to the archived data is transparent. No separate code path is needed in an application. In other words, the application still accesses the same database system, and still sends the same query as before. However, the application does not have to connect to a separate system and access the data there, nor be adjusted to execute a different query.

Various different approaches have been adopted in the industry to reduce the data volume in data warehouses. For example, an intuitive approach to reduce the data volume in tables storing recent data is to move old data to separate tables. A view can be used to combine old and recent data to enable the access to the data to become transparent.

Usage-Aware Row Storage is an approach to enable the database management system (DBMS) to move old data transparently to cheaper (and slower) storage. This requires an implementation of tracking and data moving mechanisms into the database management system (DBMS). The basic idea is to only reduce storage costs.

Near-line storage systems move data out of the database management system (DBMS) into a separate system. However, the data can no longer be queried directly via SQL until the data is brought online, where the separate system provides the capabilities to make the data available upon request.

Archiving processes for old data may vary widely. For example, a deep integration of archiving functionality into the database management system (DBMS) may be accomplished by extending the syntax and semantics of SQL statements. Another approach may treat an archive as offline-only (i.e., no access to the archived data is possible, unless the data is restored into the database).

Present invention embodiments provide significant advantages in relation to the above techniques. In particular, present invention embodiments exploit a data warehouse accelerator to store old data from a database management system. Since the old data is archived on the accelerator and physically separated from recent data in the database management system, the amount of data in the database management system is reduced, thereby providing significant benefits (e.g., reduced index sizes, exploitation of cheaper storage devices, faster back-up and recovery operations on recent data, etc.). Further, the accelerator provides superior query performance when the old data is accessed in a read-only (or read-write) manner.

Present invention embodiments further provide a significant contribution in the integration of online transaction processing (OLTP) and online analytical processing (OLAP) systems. For example, two database systems (e.g., one for transactional workload/OLTP and another for analytical workload/OLAP) are no longer needed since a single database can accommodate OLTP and OLAP data (due to the online archiving of old data (and possibly recent data) to the accelerator).

Figure 1:
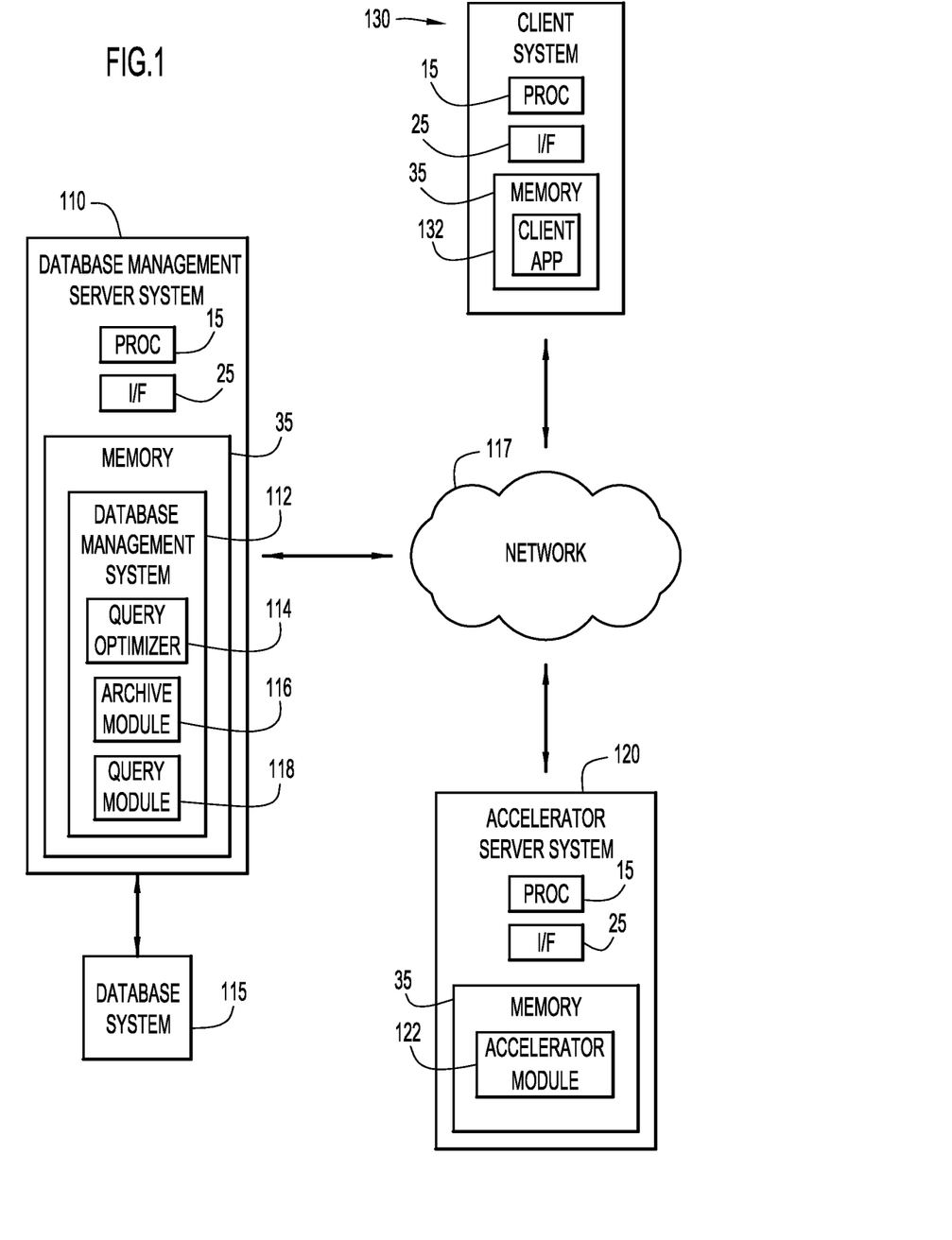
FIG. 1 is diagrammatic illustration of an example computing environment of an embodiment of the present invention.

An example computing environment or system of a present invention embodiment is illustrated in FIG. 1. In particular, a computing environment includes a database management server system 110, an accelerator server system 120, and one or more client systems 130. The server systems may be physical server systems, or be implemented as virtual server systems residing on the same physical machine or on two or more different physical machines.

Server systems 110, 120 and client system 130 may be remote from each other and communicate over a network 117. The network may be implemented by any number of any suitable communications media (e.g., wide area network (WAN), local area network (LAN), Internet, Intranet, etc.). Alternatively, server systems 110, 120 and client system 130 may be local to each other, and communicate via any appropriate local communication medium (e.g., local area network (LAN), hardwire, wireless link, Intranet, etc.).

Database management server system 110 includes and implements a database management system 112, and manages information within a database system 115. The database management system may manage any type of database. By way of example, the database management system is implemented as a relational database management system (e.g., IBM DB2 for z/OS). Database system 115 may be implemented by any conventional or other database or storage unit, may be local to or remote from database management server system 110, and may communicate via any appropriate communication medium (e.g., local area network (LAN), wide area network (WAN), Internet, hardwire, wireless link, Intranet, etc.).

Database management system 112 includes a query optimizer 114, an archive module 116, and a query module 118. Archive module 116 enables archiving of data from the database management system to accelerator server system 120, while query module 118 processes queries for archived and/or recent data as described below. Query optimizer 114 optimizes queries based on information from the archive and query modules. The archive module may be implemented as a separate module, or be combined with an administrative module for the database management system to accommodate data archiving. The query module may be implemented as a separate module, or be combined with a query routing module of the database management system to accommodate query processing in light of data archiving.

Accelerator server system 120 implements an accelerator for the database management system. The accelerator basically enhances processing of requests and other tasks for the database management system. By way of example, the accelerator server system may be implemented by an IBM Netezza system that is integrated with IBM DB2 for z/OS and serves as an IBM DB2 Analytics Accelerator (IDAA). The IBM Netezza system includes storage devices and provides less expensive storage than the database management system. The accelerator server system includes an accelerator module 122 that enhances processing for the database management system and performs data archiving and query processing for data as described below.

Client system 130 may present or utilize a graphical user (e.g., GUI, etc.) or other type of interface (e.g., command line prompts, menu screens, applications, programming interfaces, etc.) to ascertain information pertaining to requests for data, and may provide reports or displays including various information. The client system includes one or more client applications 132 that perform various processing and may provide requests for data to database management system 112.

Server systems 110, 120, and client system 130 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, client/communications/browser software, applications, database management system, query optimizer, archive module, query module, accelerator module, etc.).

Database management system 112, query optimizer 114, archive module 116, query module 118, and accelerator module 122 may include one or more modules or units to perform the various functions of present invention embodiments described below. The various modules (e.g., database management system, query optimizer, archive module, query module, and accelerator module, etc.) may be implemented by any combination of any quantity of software and/or hardware modules or units, and may reside within memory 35 of the server systems for execution by processor 15.

Figure 2:
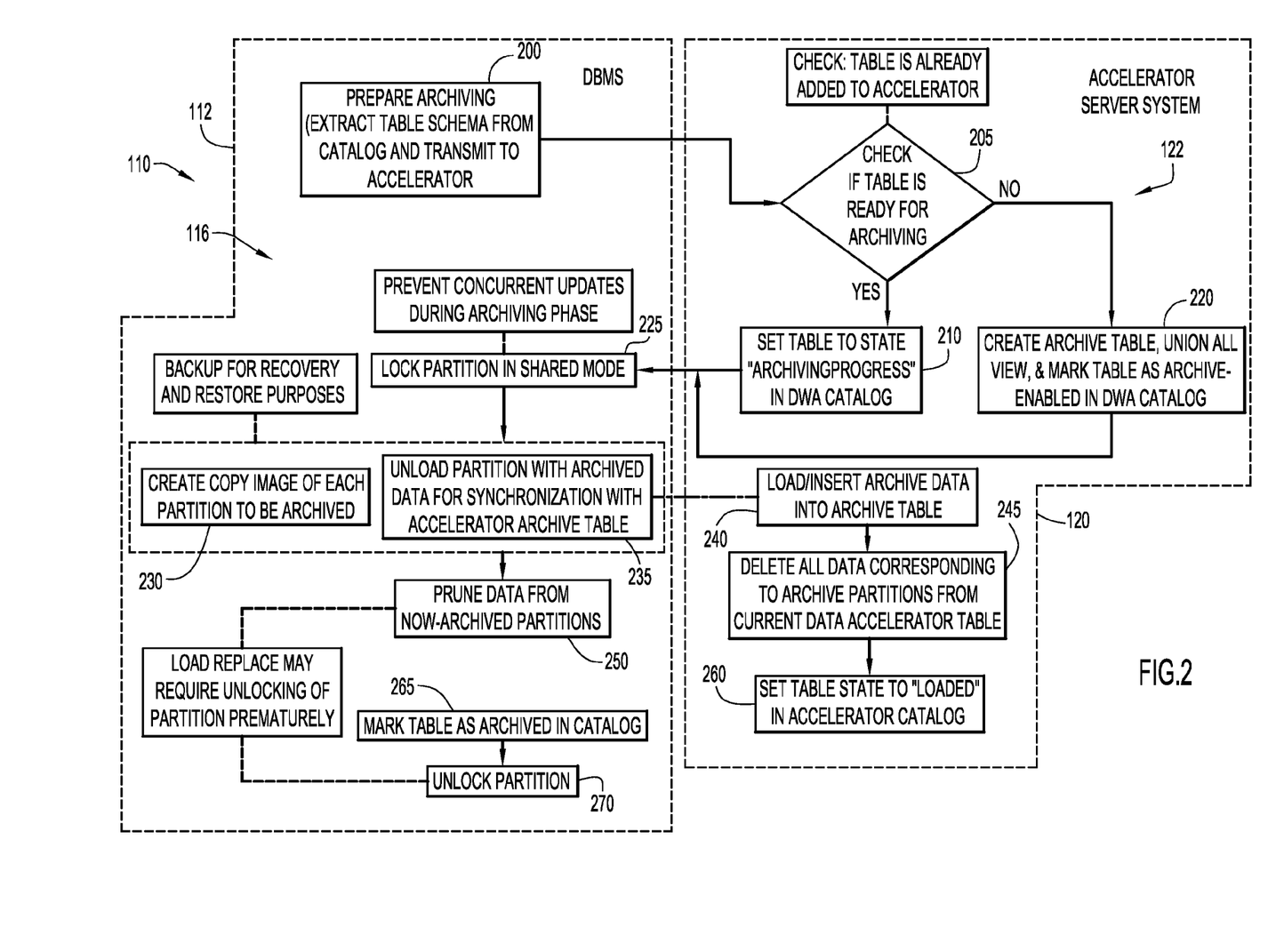
FIG. 2 is a flow diagram illustrating a manner in which data is archived from a database management system to an accelerator system according to an embodiment of the present invention.

A manner of archiving data from database management system 112 to accelerator system 120 (e.g., via server systems 110, 120, archive module 116, and accelerator module 122) is illustrated in FIG. 2. Initially, archive module 116 prepares for a data archive operation at step 200. The archive module extracts a table schema from a catalog of database management system 112 and transmits the table schema to accelerator module 122. The accelerator module determines the presence of a suitable archive table in the accelerator system and readiness of the archive table for archiving (e.g., examines the state of the table, initializes the table, etc.) at step 205. Once the archive table is determined to be suitable for archiving data, the archive module sets the state of the archive table (e.g., "ArchivingInProgress" as viewed in FIG. 2) in a catalog of the accelerator system at step 210.

If the archive table is not present or enabled for archiving as determined at step 205, the archive module creates an archive table, combines (e.g., or UNION ALL) table views, and sets the state of the created archive table as archive-enabled in the accelerator system catalog at step 220.

Once the accelerator module indicates the archive table is enabled for archiving (or a new suitable archive table has been created and enabled), archive module 116 locks one or more partitions of a table (in a shared mode) containing the data to be archived at step 225. This prevents updates to the data during the data archiving. The archive module further creates a back-up of each table partition containing data to be archived at step 230, and provides the one or more table partitions for synchronization with the archive table receiving archived data on accelerator system 120 at step 235. These steps may be performed in a parallel or pipelined fashion.

Once the table partitions with data to be archived are provided to the accelerator system, accelerator module 122 loads the data into the archive table at step 240. The loading of the data from the database management system is done to guarantee that the archived data in the accelerator system is exactly what has been written to the back-up image. The accelerator module further deletes any data of the archived table partitions residing in tables of the accelerator system that store recent data at step 245. Archived data is similarly removed from archived table partitions of the database management system by archive module 116 at step 250.

Accelerator module 122 sets a state of the archive table (e.g., "Loaded" as viewed in FIG. 2) in the accelerator system catalog at step 260. Once the state of the archive table is set on the accelerator system, archive module 116 marks the table of the database management system as archived in the database management system catalog at step 265. The archive module further unlocks the locked table partition at step 270 to enable updates. The locked table partition may be unlocked prematurely in the case of certain commands (e.g., LOAD REPLACE, etc.) (e.g., if a business process guarantees consistency of the data being archived during the archiving process (in which case no locking would be needed at all)).

An interface may be utilized to initiate archiving of table partitions (or to restore already archived partitions). The archiving may be accomplished in various manners, including defining a new syntax or creating and calling stored procedures. By way of example, a stored procedure interface is preferably employed (e.g., to initiate archive module 116). The stored procedure receives a specification that identifies the tables and table partitions eligible to be archived to the online archive of the accelerator system. The specification is preferably in the form of an Extensible Markup Language (XML) document. However, a document of any desired format that contains pertinent information may be utilized.

An example specification in an XML format may be as follows.

```
<dwa:tableSetForArchiving
xmlns:dwa="http:~//www.xxx.com/xmlns/prod/dwa/2011" version="1.0">
    <table name="SALES" schema="TPCH">
    <!-- explicitly specified logical partition numbers -->
    <partitions>1,5:10,20</partitions>
    </table>
    <table name="CUSTOMER" schema="TPCH">
    <!-- negative partition numbers count from end, -1 is last element;
        example for "all partitions except last 10" -->
        <partitions>1:-11</partitions>
    </table>
    <table name="ORDER2009" schema="TPCH">
        <!-- archive all partitions of the table →
```

-continued

```
    </table>
</dwa:tableSetForArchiving>
```

The specification is simplistic since only the table name and partition identifiers are required. Further, additional options or parameters that influence the data archiving process may be specified (e.g., specification of the back-up image to be used, workload management options for the data archiving process, options to influence the manner in which the data archive is handled on the accelerator system (e.g., combine archive data with most recent data in a single table (as opposed to separate tables)), etc.). Plural table partitions or partitions from plural tables may be archived to the online archive within the accelerator system in parallel or sequentially.

Archived table partitions in the accelerator system may be restored to the database management system (e.g., in cases of table partitions being erroneously considered to have only old data, an online archive is no longer needed, etc.). This may be accomplished by recovering back-up images (if created), or by retrieving the archived data from the accelerator system and inserting this data into corresponding tables of the database management system.

Figure 3:
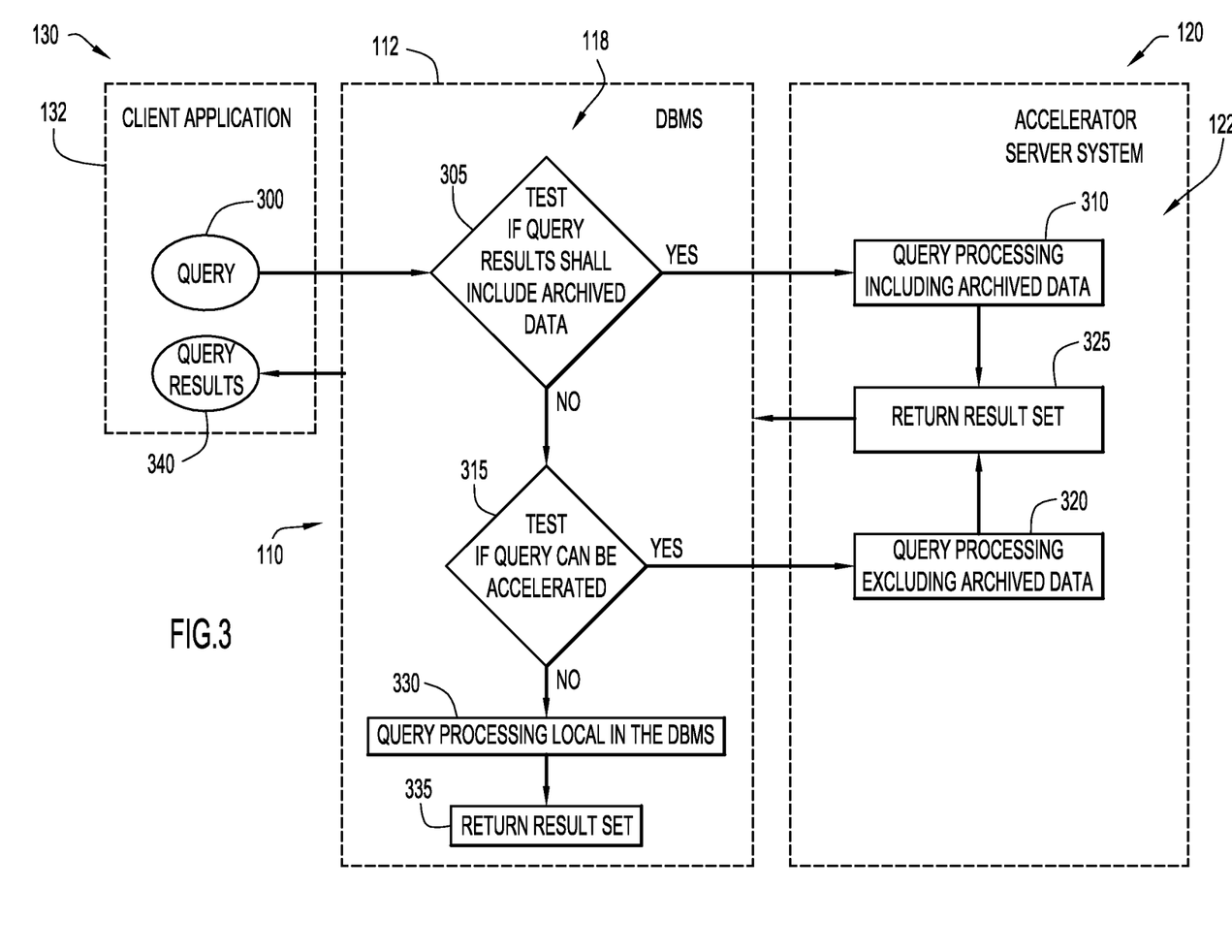
FIG. 3 is a flow diagram of a manner of processing a query for recent and/or archived data according to an embodiment of the present invention.

A manner of processing a query for recent and/or archived data (e.g., via server systems 110, 120, query module 118, and accelerator module 122) is illustrated in FIG. 3. Initially, a client application 132 of client system 130 initiates a query 300 for data within database management system 112. Query module 118 receives query 300 and determines if the query would produce query results with archived data at step 305. This determination may be performed based on a hint in the query, a special register being set, or some other profiling mechanism as described below. When the query results would include archived data, query module 118 provides query 300 to accelerator module 122 to process the query against the archive table of the accelerator system at step 310 and retrieve results. The accelerator module provides the result set to the database management system at step 325 for transference to client application 132 to serve as query results 340.

When query 300 would not produce query results with archived data as determined at step 305, the query module determines eligibility of the query for acceleration by the accelerator system at step 315. If query 300 is eligible for acceleration, query module 118 provides query 300 to accelerator module 122. The accelerator module processes the query against recent data stored within the accelerator system at step 320 and retrieves results. The accelerator module provides the result set to the database management system at step 325 for transference to client application 132 to serve as query results 340 as described above.

If query 300 is not eligible for acceleration as determined at step 315, query module 118 processes the query against recent data within the database management system at step 330 and retrieves results. The query module provides the result set to client application 132 at step 335 to serve as query results 340.

An example of archiving and querying data according to an embodiment of the present invention is illustrated in FIGS. 4A-4D. Initially, data resides within database management system 112 in a table 410 including a plurality of table partitions 412 (e.g., part 1 to part n as viewed in FIG. 4A). Similarly, data may reside in accelerator system 120 in a table 415 including a plurality of table partitions 417 (e.g., part 1 to part n as viewed in FIG. 4A). The accelerator system may contain old and/or recent data. Alternatively, the accelerator system may be without data at the initiation of a data archiving process. Client application 132 may process a command 400 (e.g., SELECT FROM X as viewed in FIG. 4A) to request data from the database management system.

Figure 4A:
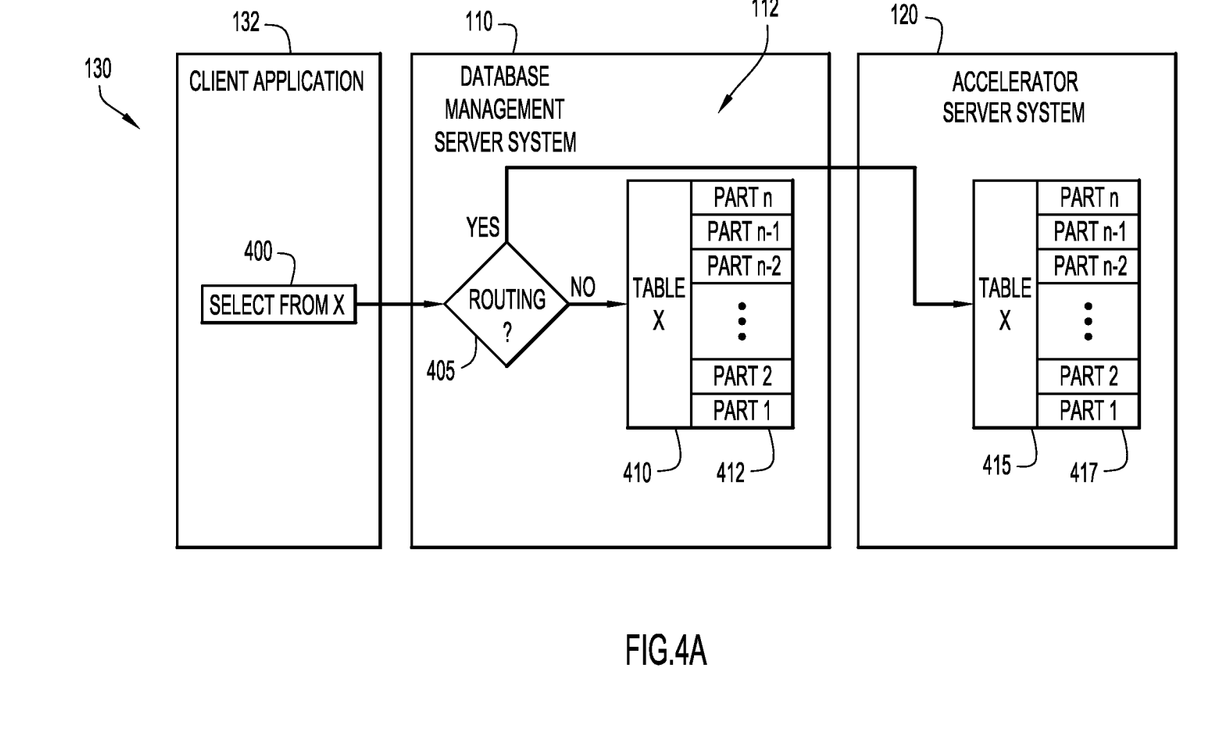
FIG. 4A is a diagrammatic illustration of an example initial state for a database management system and accelerator system for data archiving and query processing according to an embodiment of the present invention.
Figure 4B:
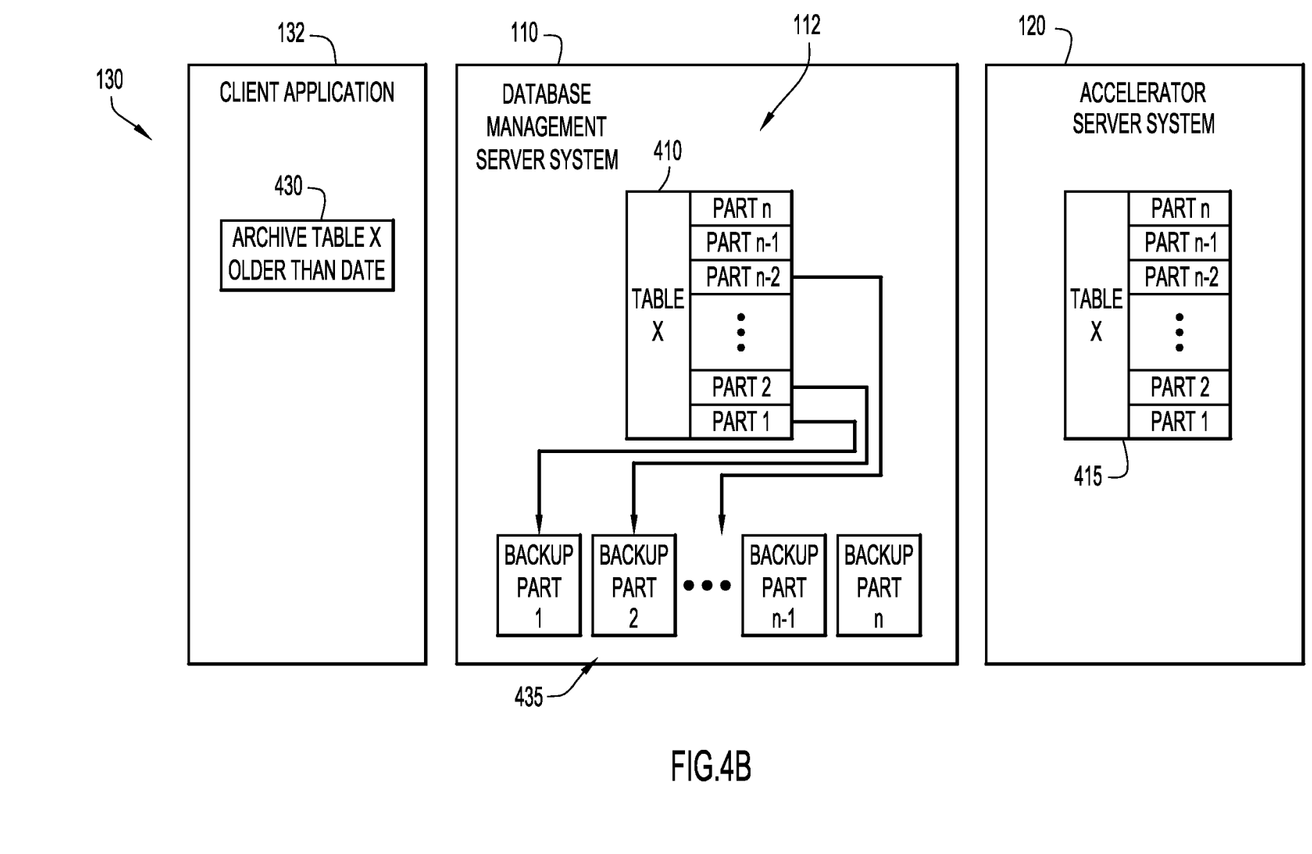
FIG. 4B is a diagrammatic illustration of creating a back-up image for a database management system according to an embodiment of the present invention.

Referring to FIG. 4B, an initial task for archiving data includes creating one or more back-up images 435 in database management system 112 to enable recovery of data. Each back-up image 435 preferably pertains to a corresponding table partition 412. However, the back-up images may each correspond to any quantity of table partitions. The creation of the back-up image is not required for the operation of the online archive of the accelerator system. Further, in the event the accelerator system provides back-up/restore mechanisms, creation of the back-up image in the database management system is not needed. By way of example, the back-up images are created in a present invention embodiment since the accelerator system of that embodiment does not provide external back-up/recovery mechanisms. In this case, database management system 112 remains the sole owner of the data in the database management system and the accelerator system.

Figure 4C:
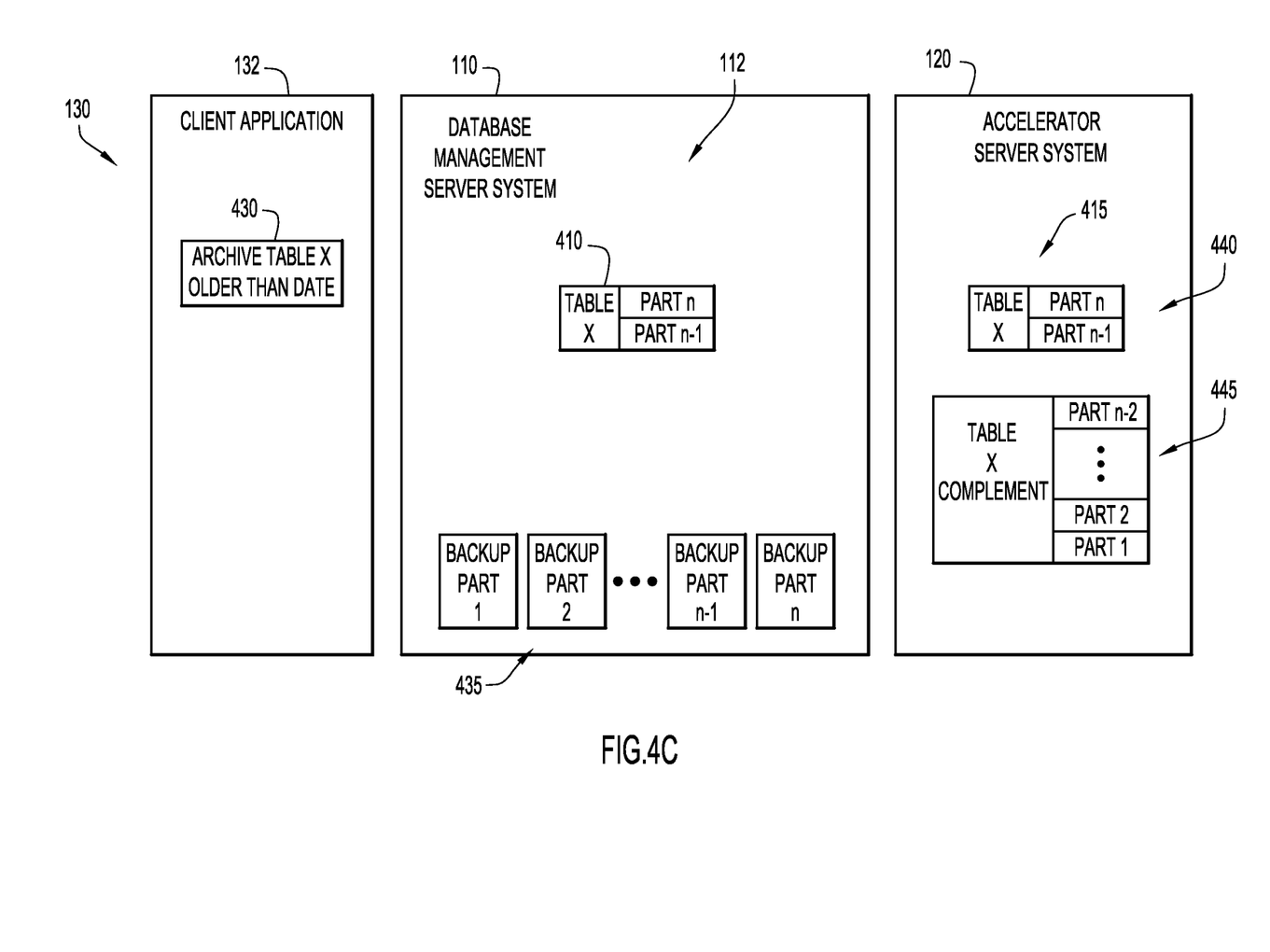
FIG. 4C is a diagrammatic illustration of archiving data from the database management system to the accelerator system according to an embodiment of the present invention.

Archived data is purged from database management system 112 and archived to accelerator system 120 (FIG. 4C). This achieves reduction of the data volume in the database management system, reduces the index sizes, and enables disk space to be reclaimed. By way of example, client application 132 may provide an archive command 430 indicating that data beyond a certain date be archived (e.g., ARCHIVE TABLE X OLDER THAN 'date' as viewed in FIG. 4C). Table partitions 445 (e.g., part 1 to part n−2 as viewed in FIG. 4C) containing the specified data are archived from table 410 of database management system 112 to table 415 of accelerator system 120. Although the schema information of the archived table partitions are still present in the table of the database management system, these partitions are empty and the disk space use is limited to the primary allocation quantity (which can be specified to be small). Alternatively, the disk space may be freed completely.

The archived data on accelerator system 120 may be divided among two or more separate tables or be maintained in a single table. In the case of a single table, the accelerator system may not contain recent data, or include a mechanism to identify table rows containing recent data and table rows containing archived data (e.g., employing an additional archive flag for each row indicating the type of data (e.g., recent or archived) in that row). The accelerator system may store only the archived data, where access to the recent data and the archived data may be accomplished by the database management system combining both data sets (e.g., via conventional federated technologies). However, query execution may potentially provide better performance when the full query is executed by the accelerator system having recent and archived data (as opposed to a distributed query execution across the database management system and the accelerator system). When recent data is stored in the accelerator system, existing mechanisms for explicit or log-based synchronization (with data in the database management system) may be employed.

Figure 4D:
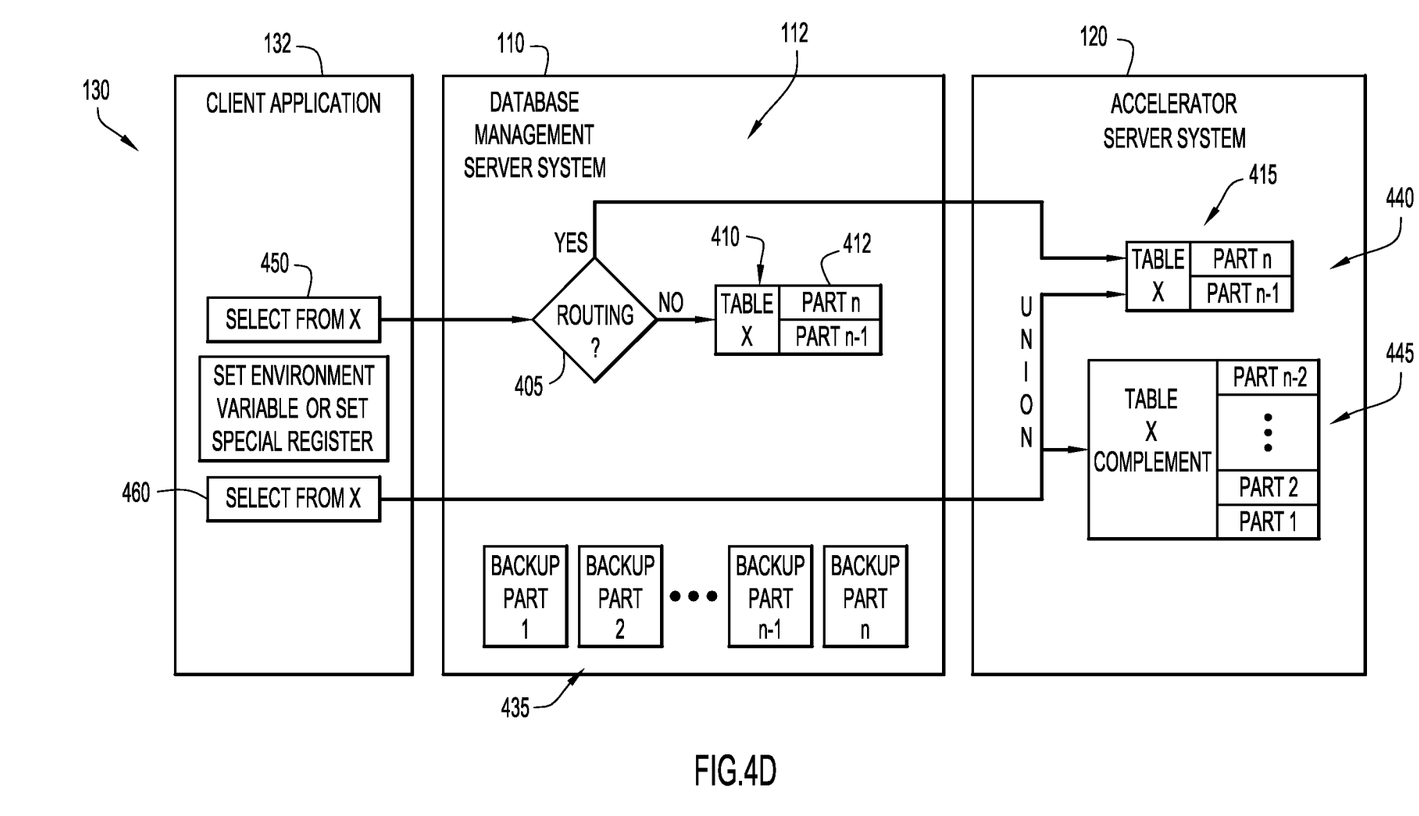
FIG. 4D is a flow diagram of processing an example query against data within the database management system and archived data within the accelerator system according to an embodiment of the present invention.

Referring to FIG. 4D, the recent and/or archived data may be accessed in order to process a query. For example, if client application 132 is transactional (e.g., online transaction processing (OLTP)) and needs to process only recent data, the application provides a query 450 (e.g., SELECT FROM X as viewed in FIG. 4D) that is executed directly against the database management system (e.g., partitions 412 of table 410). Since only recent data is needed, the database management system may process the query, or may send the query to the accelerator system for processing (e.g., based on functionality for accelerator systems, such as IDAA) as determined at flow 405.

If client application 132 is an analytical application and wants to access the data, the application provides a query 460 (e.g., SELECT FROM X as viewed in FIG. 4D) indicating to database management system 112 that recent and archived data are to be accessed. This may be accomplished by an indication via a special register or profiles or hints embedded in the query (e.g., SQL statement, etc.). For example, an environment variable may be set external of the application via a profile table parameter (without changes to the client application). Alternatively, a special register may be set from within the client application that allows changing of the scope of the access at a statement level. Since the old data no longer exists in the database management system, the query is always sent to the accelerator system for processing. Query results are transparently provided to the client application through the database management system. Thus, the access to the archived data is fully transparent to the client application.

With respect to certain sets of queries, access of archived data may be determined based on query predicates. For example, when a predicate exists that involves a partitioning key of the table or partition identifiers (IDs), an evaluation of these types of predicates determines access of archived partitions (without evaluation of other predicates).

The system of present invention embodiments provides the basis for transparent access to data, irrespective of where the data resides (e.g., on the database management system (e.g., IBM DB2 z/OS storage) or on the accelerator system (e.g., IBM Netezza system)). This is exploited to support online archiving functionality. Although some changes (e.g., to distinguish between accesses to only recent data and to recent and archived data) are implemented in the database management system as described above (e.g., archive and query modules, etc.), these changes are very localized and minor. Thus, the implementation costs for the online archive are much less than those for a full integration of archiving functionality into a database management system kernel (e.g., IBM DB2).

Certain accelerator systems (e.g., IBM DB2 Analytics Accelerator (IDAA), etc.) do not allow combining data residing in the database management system with data on an accelerator system or data across multiple accelerator systems. This implies that table partitions with old data need to be archived to the online archive on the same accelerator system. However, when this type of restriction does not exist (i.e., the database management system may combine data from plural accelerator systems with data stored locally in the database management system), each table partition may be stored in an online archive on one or more accelerator systems. A manner to realize this functionality is to populate the data in the online archive (accelerator system or accelerator systems) from a back-up image that was created when the table partition was first archived.

When data is removed from a database management system, there may be constraints (e.g., foreign keys, check constraints, assertions, etc.) that may be affected by this removal. For example, if data is archived to an online archive (accelerator system), the archived table rows no longer exist in the database management system. When the archived table rows serve as parents in a foreign key relationship, this relationship is severed. In order to maintain these relationships, present invention embodiments forbid and block archiving of partitions of these types of tables. This may be accomplished by storing the definition of all constraints in the database catalog. When an attempt is made to archive a partition of a table, a check is made against the database catalog to determine the presence of a problematic constraint defined on the table. If a constraint is present, an error is raised and no data will be archived. With respect to a present invention embodiment employing IBM DB2 z/OS, there may only be concern with respect to referential constraints since IBM DB2 z/OS does not have assertions, and check constraints are applied to each row individually.

Alternatively, an extension to the database management system may be employed to check constraints and assertions against the data residing in the database management system and data in the accelerator system.

Although a present invention embodiment may be utilized with current data being available in the database management system and in the accelerator system, the current data may reside only in the database management system. Thus, the accelerator system contains only the archived data. In this case, query execution is adjusted (e.g., via query module 118). For example, the database management system may rewrite a query involving archived data to combine (e.g., a UNION ALL) the data locally in the database management system and the archived data in the accelerator system. Conventional federated technologies may be employed to optimize the query execution (e.g., enable predicates to be processed by the accelerator system). In addition, conventional branch elimination techniques may be employed (e.g., for UNION ALL views, etc.).

The schema of a table in the database management system is generally fixed and immutable to enable the schema of the corresponding archive table in the accelerator system to match. However, when schema modifications in the database management system are necessary (e.g., adding new columns, dropping obsolete columns, adding/dropping constraints, etc.), these changes need to be propagated to the accelerator system. For example, new versions of the archive tables may be used to match schemas, or schema modifications may be propagated from the database management system to the accelerator system. In addition, various conventional techniques may be employed to accommodate the propagation.

It will be appreciated that the embodiments described above and illustrated in the drawings represent only a few of the many ways of implementing embodiments for archiving data in database management systems.

The environment or system of the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, database management system, query optimizer, archive module, query module, accelerator module, etc.). These systems may include any types of monitors and input devices (e.g., keyboard, mouse, voice recognition, etc.) to enter and/or view information. In addition, the computer systems may host any quantity of any physical or virtual servers.

It is to be understood that the software (e.g., database management system, query optimizer, archive module, query module, accelerator module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments (e.g., database management system, query optimizer, archive module, query module, accelerator module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database systems may be implemented by any number of any conventional or other databases, data stores or storage structures (e.g., files, databases, data structures, data or other repositories, etc.) to store information. The database systems may be included within or coupled to the server and/or client systems. The database systems and/or storage structures may be remote from or local to the computer or other processing systems, and may store any desired data.

The accelerator system may be implemented by any quantity of any type of secondary or archive system (e.g., processing system, accelerator, storage system, etc.) to assist in storing data and/or processing requests for data. Further, the database management system may be implemented by any database or data management system of any types of data arrangements (e.g., relational, hierarchical, etc.). The states of the archive table may include any suitable values to indicate the state of the table (e.g., loaded, enabled, etc.).

Data may be archived from the database management system to the accelerator system based on any desired criteria (e.g., age of the data, type of data, values of the data, etc.). By way of example, present invention embodiments archive data determined to be old (as opposed to recent). However, any desired criteria may be utilized to determine recent (or current) and old data (e.g., access frequency, times between accesses, quantity of accesses, last time accessed, age of the data, etc.) given a suitable partitioning of the data.

Data may be archived from any types of data objects, where the objects may be partitioned in any desired fashion. Any quantity of any portions of partitions may be archived. A back-up image may store data from any quantity of partitions. The specification for archiving may include any format (e.g., XML, etc.) and any desired information arranged in any fashion (e.g., various parameters, partitions, data to archive, etc.).

Data may be divided between the database management system and accelerator system (or a secondary system) in any fashion based on any suitable criteria. The database management system and accelerator or secondary systems may each have their own data sets (e.g., recent and old, etc.), or the accelerator may further include data stored in the database management system (e.g., old and recent). Queries may be processed by the database management system and accelerator or secondary systems either individually or in combination. This may be determined based on the location of data needed for the queries. The queries may include any suitable commands to request data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user.

The present invention embodiments are not limited to the specific tasks or algorithms described above, but may be utilized with any data management and secondary system to archive data and maintain access to that archived data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
   archiving at least a portion of data from a first processing system onto a second processing system;
   determining, via the first processing system, whether data satisfying a received query is the archived data or non-archived data;
   in response to the determined data being the archived data, transferring the received query from the first processing system to the second processing system to retrieve archived data satisfying the received query;
   in response to the determined data being non-archived data;
      determining, via the first processing system, eligibility of the received query for processing by the second processing system;
      processing the received query, via the first processing system, to retrieve non-archived data satisfying the received query in response to the received query being ineligible for processing by the second processing system; and
      transferring the received query from the first processing system to the second processing system to retrieve non-archived data satisfying the received query in response to the received query being eligible for processing by the second processing system.

2. The computer-implemented method of claim 1, wherein the data for archiving includes data beyond a certain date.

3. The computer-implemented method of claim 1, wherein the data within the first processing system is stored in one or more partitions of a table, and archiving includes:
   archiving one or more partitions of the table storing the data to be archived.

4. The computer-implemented method of claim 1, wherein the first processing system is a database management system, and the second processing system is a database accelerator.

5. The computer-implemented method of claim 4, further comprising:
   transferring the received query from the database management system to the database accelerator to retrieve the non-archived data satisfying the received query in response to determining that the received query is directed to the non-archived data and is eligible for acceleration by the database accelerator.

6. The computer-implemented method of claim 1, further comprising:
   receiving the query from an application and determining a location to process the received query based on a variable external of the application and indicating the data satisfying the received query, wherein the location includes one of the first processing system and second processing system.

7. The computer-implemented method of claim 1, further comprising:
   receiving the query from an application and determining a location to process the received query based on an indication of the data satisfying the received query within a statement of the application, wherein the location includes one of the first processing system and second processing system.

* * * * *